(12) United States Patent
Xia et al.

(10) Patent No.: US 8,619,797 B2
(45) Date of Patent: Dec. 31, 2013

(54) USING INTERNET PROTOCOL VERSION SIX (IPV6) TUNNEL FOR ACCESS IDENTIFIER TRANSPORT

(75) Inventors: Yangsong Xia, Richardson, TX (US); John Kaippallimalil, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 460 days.

(21) Appl. No.: 12/773,092

(22) Filed: May 4, 2010

(65) Prior Publication Data

US 2010/0290478 A1 Nov. 18, 2010

Related U.S. Application Data

(60) Provisional application No. 61/177,590, filed on May 12, 2009.

(51) Int. Cl.
*H04L 12/28* (2006.01)

(52) U.S. Cl.
USPC .......................... 370/401; 370/389; 370/392

(58) Field of Classification Search
None
See application file for complete search history.

(56) References Cited

U.S. PATENT DOCUMENTS

| 7,483,697 | B2 * | 1/2009 | Ohki | 455/432.1 |
|---|---|---|---|---|
| 2004/0137888 | A1 * | 7/2004 | Ohki | 455/417 |
| 2006/0056426 | A1 * | 3/2006 | Wakameda et al. | 370/401 |
| 2006/0080728 | A1 * | 4/2006 | Wen et al. | 726/4 |
| 2006/0098575 | A1 * | 5/2006 | Lee | 370/237 |
| 2006/0184694 | A1 * | 8/2006 | Monette et al. | 709/246 |
| 2006/0215657 | A1 * | 9/2006 | Lee et al. | 370/389 |
| 2007/0147421 | A1 * | 6/2007 | Kim | 370/466 |
| 2007/0288550 | A1 * | 12/2007 | Ise et al. | 709/203 |
| 2008/0301434 | A1 * | 12/2008 | Haddad et al. | 713/153 |
| 2009/0067381 | A1 * | 3/2009 | Grech | 370/329 |
| 2009/0103550 | A1 * | 4/2009 | Miyata et al. | 370/400 |
| 2010/0189052 | A1 * | 7/2010 | Kavanagh et al. | 370/329 |

OTHER PUBLICATIONS

Krishnan, et al., "Line Identification in IPv6 Router Solicitation Messages," draft-krishnan-6man-rs-mark-04.txt; Mar. 8, 2010.
Krishnan, et al., "Line Identification in IPv6 Router Solicitation Messages," draft-krishnan-6man-rs-mark-02.txt; Mar. 8, 2009.
Conta, A., "Generic Packet Tunneling in IPv6 Specification," RFC 2473, Dec. 1998.
"Ethernet Active Line Access: Updated Technical Requirements," OFCOM, Office of Communications, Mar. 3, 2009.
Kaippallimalil, J., "Line ID in IPv6 Requirements," Project WT-177, BBF2009.461, May 12, 2009.

(Continued)

*Primary Examiner* — Hassan Phillips
*Assistant Examiner* — Hicham Foud
(74) *Attorney, Agent, or Firm* — Conley Rose, P.C.; Grant Rodolph; Brandt D. Howell (57) ABSTRACT

Included are devices, systems, and methods which may be employed in an access network. An access node (AN) may be configured to communicate with a residential gateway (RG) via the access network. The AN may also be configured to encapsulate a router solicitation (RS) from the RG with a header comprising an access identifier associated with the RG. The AN may send the encapsulated RS to an Internet Protocol (IP) edge. The AN may also be configured to receive a responsive router advertisement (RA) from the IP edge and may forward the RA to the RG based on the access identifier.

17 Claims, 5 Drawing Sheets

(56) References Cited

OTHER PUBLICATIONS

Loughney, J., Ed., "IPv6 Node Requirements," RFC 4294, Apr. 2006.

Deering, S., et a.l, "Internet Protocol, Version 6 (IPv6) Specification," RFC 2460, Dec. 1998.

Narten, T., et al., "Neighbor Discovery for IP Version 6 (IPv6),", RFC 4861, Sep. 2007.

Thomson, S., et al., "IPv6 Stateless Address Autoconfiguration," RFC 4862, Sep. 2007.

Patrick, M., "DHCP Relay Agent Information Option," RFC 3046, Jan. 2001.

Kavanagh, A., et al., "WT-177: Line ID Option for IPv6," Project: Architecture and Transport WG; BBF 2009.153, Sep. 1, 2008.

Troan, O., et al., "IPv6 Prefix Options for Dynamic Host Configuration Protocol (DHCP) version 6," Network Working Group, RFC 3633, Dec. 2003, 18 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE 802.ah™-2004, Sep. 7, 2004, 640 pages.

"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 4: Further Higher Data Rate Extension in the 2.4 GHz Band," IEEE 802.11g™-2003, Jun. 27, 2003, 78 pages.

"IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1," IEEE 802.16e™-2005 and IEEE 802.161™-2004/Cor1-2005, Feb. 28, 2006, 864 pages.

Aboba, B., et al., "The Network Access Identifier," Network Working Group, RFC 2486, Jan. 1999, 8 pages.

\* cited by examiner

USING INTERNET PROTOCOL VERSION SIX (IPV6) TUNNEL FOR ACCESS IDENTIFIER TRANSPORT

CROSS-REFERENCE TO RELATED APPLICATIONS

The present application claims priority to U.S. Provisional Patent Application No. 61/177,590 filed May 12, 2009 by Yangsong Xia et al. and entitled "Method and System for Using IPv6 Tunnel for Access ID Transport in Broadband Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standard, WI-FI based on the IEEE 802.11 standard, and Worldwide Interoperability for Microwave Access (WiMAX) based on the IEEE 802.16 standard. However, specific mechanisms for IPv6 to meet some technology requirements have not yet been developed. For example, in a fixed broadband network, several network entities (e.g. residential routers) may be coupled to an access node (AN), which may be coupled to the interface of an IP edge. In the IPv6 stateless address autoconfiguration protocol, a network entity sends out a router solicitation (RS) to an IP edge, and the IP edge responds with a router advertisement (RA). The RA comprises the advertised prefix for stateless address autoconfiguration as specified in the Internet Engineering Task Force (IETF) Request for Comments (RFC) 4862, which is incorporated herein by reference as if reproduced in its entirety. The advertised prefix may contain addressing information and policy specific to the residential router.

SUMMARY

In one embodiment, the disclosure includes a method comprising encapsulating a message with a tunnel header comprising an access identifier associated with a network entity.

In another embodiment, the disclosure includes an apparatus comprising an AN configured to communicate with a residential gateway (RG) via the access network, wherein the AN is configured to encapsulate a RS with a header comprising an access identifier associated with the RG, and send the encapsulated RS to an IP edge, wherein the AN is configured to receive a RA, wherein the AN is configured to forward the RA to the RG associated with the access identifier.

In yet another embodiment, the disclosure includes a network component comprising a processor configured to implement a method comprising receiving a message, constructing a tunnel header, constructing a Destination Options header comprising an access identifier associated with a network entity, encapsulating the message with the tunnel header and the Destination Options header, and sending the encapsulated message to a device, wherein the message is not altered by the processor.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for the IP edge to identify a network entity (e.g. residential router) associated with a RS using a tunnel header associated with the RS. An AN may receive the RS from a network entity and encapsulate the RS with the tunnel header. The tunnel header may comprise a destination options header that may comprise an access identifier option and an access identifier associated with the network entity. The IP edge may be configured to send a RA to the RG, the RA comprising the access identifier associated with the network entity. In embodiments, the tunnel header is an IPv6 tunnel header, and/or the access identifier associated with the network entity may identify a logical access loop port of the AN.

Figure 1:
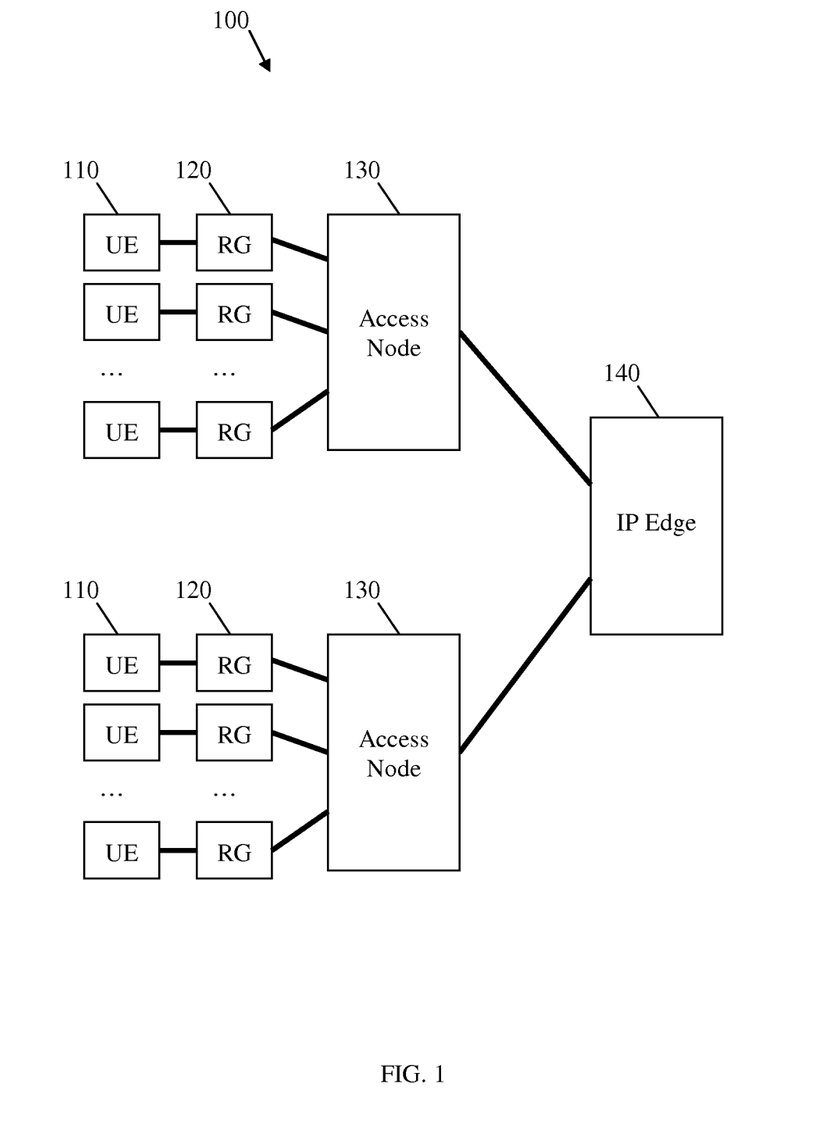
FIG. 1 is a schematic diagram of an embodiment of an access network system.

FIG. 1 illustrates an embodiment of an access network system 100, which may be based on DSL technology. The access network system 100 may comprise at least one user equipment (UE) 110, at least one RG 120, at least one AN 130, and an IP edge 140. The UE 110 may be coupled to the RG 120, for instance at a customer premise or a local network. The AN 130 may be located at an access network and may be coupled to the RG 120. The AN 130 may also be coupled to an aggregation network, such as an IP network. The IP edge 140 may be located at a regional broadband network and may be coupled to the AN 130, for instance, via an aggregation network.

The UE 110 may be any device or network entity associated with the subscriber that is configured to transmit or receive signals to and from the RG 120, such as an electrical or optical signal. In one embodiment, the UE 110 may create, send, or receive the signals using a communication link, such as a wired cable or a fiber optic cable, between the UE 110 and the RG 120. The UE 110 may be a fixed device, such as a desktop computer, a telephone such as a voice over IP (VoIP) telephone, or a set top box. Alternatively, the UE 110 may be a portable device, such as a laptop computer, or a cordless phone, which may use a wireless communication link to communicate with the RG 120.

The RG 120 may be any device, component, or network configured to allow the UE 110 to gain access to the access network associated with the AN 130. For instance, the RG 120 may be configured to establish a communication link with the UE 110 and forward communications between the UE 110 and the AN 130. For example, the RG 120 may be an IP router, such as a customer premises equipment (CPE) router or any router equipment located at a subscriber's premises and that communicates with the access network. Alternatively, the RG 120 may be a DSL modem, a cable modem, or an optical network terminal (ONT)/optical network unit (ONU) in a passive optical network (PON). In yet another embodiment, the RG 120 may be a node that forwards IPv4 and/or IPv6 packets to and from the UE 110.

The AN 130 may be any device that is configured to transport communications between the RG 120 and the IP edge 140. For example, the AN 130 may be a switch, a router, or a bridge, such as a Provider Edge Bridge (PEB) or a Provider Core Bridge (PCB). In other embodiments, the AN 130 may be an IP DSL Access Multiplexer (DSLAM) as defined by the Broadband Forum. The AN 130 may be coupled to the RG 120 and the IP Edge 140 via communication links implementing a protocol such as Ethernet or IP. In one embodiment, the AN 130 may support IPv6 stateless address autoconfiguration. As such, the AN 130 may receive a RS from the RG 120, and forward the RS to the IP edge 140. Further, the AN 130 may receive a RA from the IP edge 140, and forward the RA to the RG 120.

The IP edge 140 may be any device that is configured to transport packets between the AN 130 and a service provider network and/or the Internet. For example, the IP edge 140 may comprise bridges, switches, routers, or combinations thereof. The IP edge 140 may provide stateless address autoconfiguration information to the UE 110.

In an embodiment, the RG 120 may send a RS to the AN 130. While the RG Media Access Control (MAC) address may be used to deliver packets to the RG 120, the RG MAC address may not uniquely identify the RG itself. As such, the AN 130 may be configured to encapsulate the RS with a tunnel header comprising an access identifier associated with the network entity, as described in detail below. The AN 130 may forward the RS to an IP edge 140. The IP edge 140 may inspect the RS to identify the network entity that sent the RS. The IP edge 140 then may respond with a RA comprising an advertised prefix for stateless address auto configuration. The AN 130 may forward the RA to the RG 120.

Figure 2:
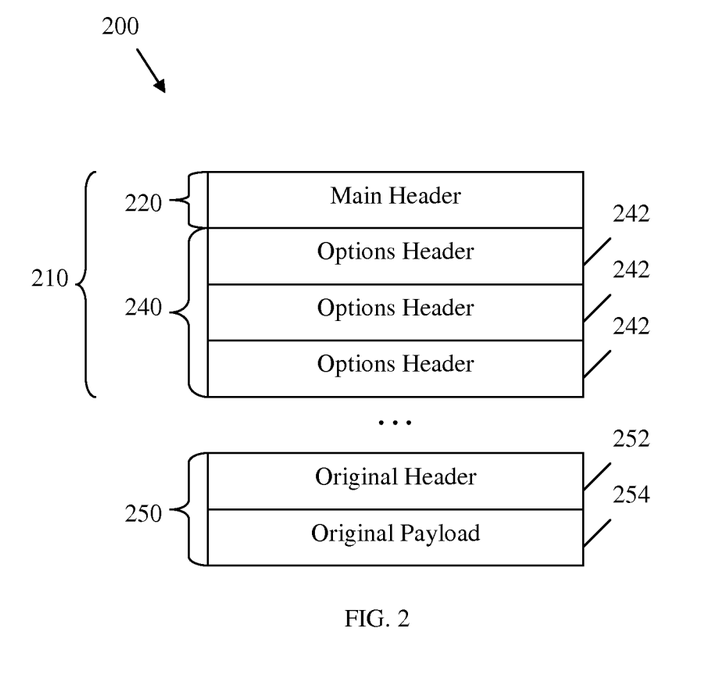
FIG. 2 is a schematic diagram of an embodiment of a tunneled RS.

FIG. 2 illustrates one embodiment of a tunneled RS 200. In an embodiment, the tunneled RS 200 may comprise a plurality of fields, such as a Tunnel Header 210 and an Original Packet 250. The Tunnel Header 210 may be a generic packet tunnel (GPT) header as specified in the IETF RFC 2473, which is incorporated herein by reference as if reproduced in its entirety. In one embodiment, the Tunnel Header 210 may comprise a Main Header 220 and an Extension Header 240, which may comprise a plurality of Options Header fields 242. In a specific embodiment, the tunneled RS 200 may be an IPv6 packet, the Tunnel Header 210 may be an IPv6 tunnel header, the Main Header 220 may be an IPv6 header, and the Extension Header 240 may be an IPv6 extension header. The Original Packet 250 may comprise of a plurality of fields such as an Original Header 252 and an Original Payload 254. When the Tunnel Header 210 encapsulates the Original Packet 250, the Original Header 252 and the Original Payload 254 may not be modified. Therefore, there may be no modification of the security key used between the RG and the IP Edge in the Neighborhood Discovery (ND) protocol specified in the IETF RFC 4861, which is incorporated herein by reference as if reproduced in its entirety.

In one embodiment, the Main Header 220 may comprise a plurality of fields, such as a Version, a Traffic Class, a Flow Label, a Payload Length, a Next Header, a Hop Limit, a Source Address, and a Destination Address. The Version may indicate the IP version and may be equal to about 0110 for IPv6. The six most-significant bits of the Traffic Class may be used for Differentiated Services Code Point (DSCP), which may be used to classify packets. The remaining two bits may be used for Explicit Congestion Notification (ECN). The Flow Label may be used for real-time applications special service. The Payload Length may indicate the length of the payload in bytes, including the length of the Extension Header 240. The Next Header may identify the type of header immediately following the Main Header 220. The Hop Limit may be a counter that may be decremented by one at each intermediate node the tunneled RS 200 visits. The Hop Limit may not be decremented if the tunneled RS 200 visits the AN 130. The Source Address may indicate the IPv6 address of the sending node, and the Destination Address may indicate the IPv6 address of the receiving node. In one embodiment, the length of the Main Header 220 may be about 40 bytes, the length of the Version may be about six bits, the length of the Traffic Class may be about one byte, the length of the Flow Label may be about 20 bits, the length of the Payload Length may be about two bytes, the length of the Next Header may be about one byte, the length of the Hop Limit may be about one byte, the length of the Source Address may be about 16 bytes, and the length of the Destination Address may be about 16 bytes.

The Options Header 242 may encode optional IP-layer information. For example, the structure of the Options Header 242 may be specified in the IETF RFC 2460, which is incorporated herein by reference as if reproduced in its entirety. In one embodiment, the length of the Options Header 242 may be an integer multiple of about eight bytes. The Options Header 242 may comprise a next header field indicating the type of Options Header 242 immediately following the Options Header 242. In one embodiment, the next header field may be equal to about 60 if the Options Header 242 immediately following the Options Header 242 is a Destination Options Header described below. It will be appreciated that a format similar to that illustrated in FIG. 2 could be used to encapsulate the RA and/or neighbor solicitation (NS).

Figure 3:
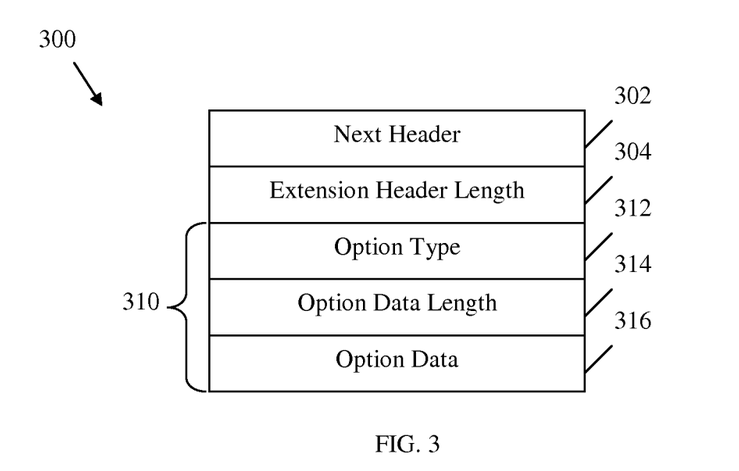
FIG. 3 is a schematic diagram of an embodiment of a Destination Options header.

FIG. 3 illustrates one embodiment of the Destination Options Header 300, which may be an embodiment of an Options Header 242. For example, the Destination Options Header 300 may be an IPv6 Destination Options Header. The Destination Options Header 300 may comprise a plurality of fields such as a Next Header 302, an Extension Header Length 304, and an Options field 310. The Next Header 302 may identify the type of header immediately following the Next Header 302. The Extension Header Length 304 may comprise a length (e.g. in bytes) of the Destination Options Header 300. In one embodiment, the Extension Header Length 304 may comprise a length associated with the length of the Destination Options Header 300, excluding the first eight bytes.

The Options 310 may comprise an Option Type 312, an Option Data Length 314, and an Option Data field 316. The Option Type 312 may identify the option type. In one embodiment, the Option Type 312 may be associated with an access identifier associated with a network entity. The Option Data Length 314 may comprise a length (e.g. in bytes) of the option. The Option Data 316 may comprise an access identifier that indicates the network entity and/or RG associated with the tunneled RS. The access identifier may comprise one or more of: a network address, such as a RG MAC address; a customer Virtual Local Area Network (VLAN) address; and a line identifier associated with the destination node. The line identifier may be associated with an agent circuit identifier (ID) or agent remote ID as defined in the IETF RFC 3046, which is incorporated herein by reference as if reproduced in its entirety. In an embodiment, the access identifier associated with the network entity identifies a logical access loop port of the AN 130. In an embodiment, the length of each of the Next Header 302, the Extension Header Length 304, the Option Type 312, and the Option Data Length 314 may be equal to about one byte. The length of Option Data 316 may be variable such that the length of the Destination Options Header 300 may be a multiple of about eight bytes.

Figure 4:
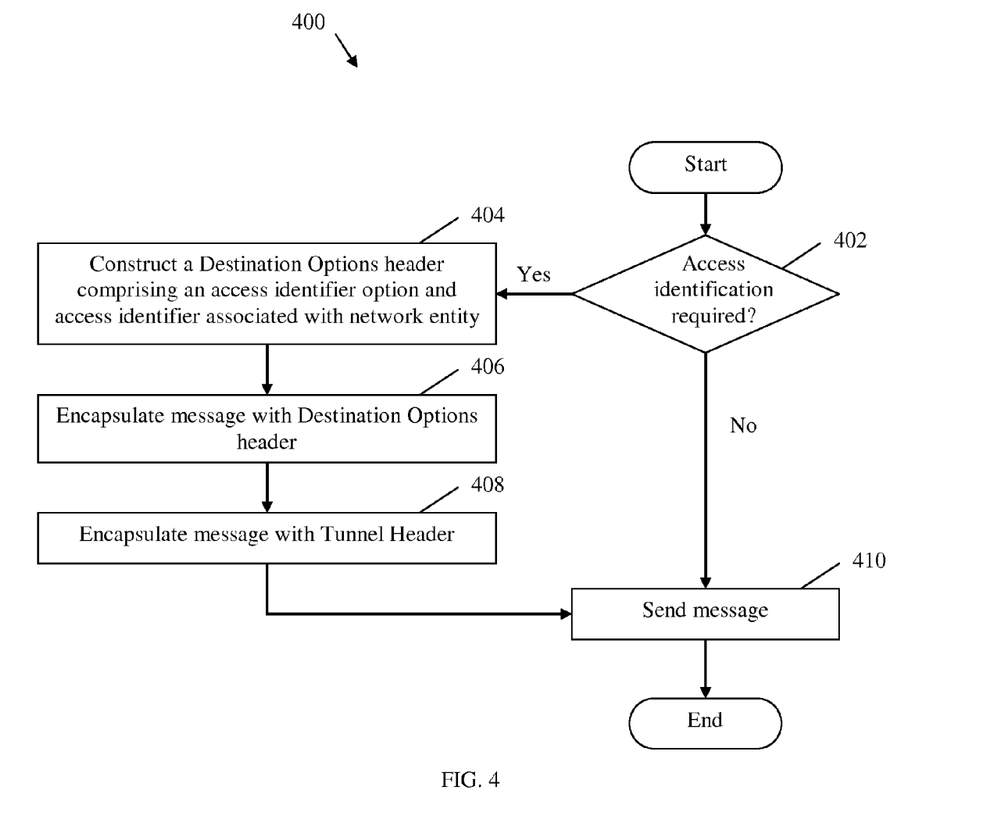
FIG. 4 is a flowchart of an embodiment of a message encapsulation method.

FIG. 4 illustrates one embodiment of a message encapsulation method 400, which may be used to encapsulate a message with a tunnel header comprising an access identifier associated with the network entity. The message encapsulation method 400 may be implemented by an AN for upstream messages (e.g. the tunneled RS), or may be implemented at an IP edge for downstream messages (e.g. the RA). The message encapsulation method 400 may begin at block 402, where the message encapsulation method 400 may determine whether access identification is required. The message encapsulation method 400 may continue to block 404 if the condition in block 402 is met, or may proceed to block 410 if the condition in block 402 is not met. At block 404, the message encapsulation method 400 may construct a Destination Options header comprising an access identifier option and an access identifier associated with a network entity. For example, the Destination Options header may be as illustrated in FIG. 3. Next, at block 406, the message encapsulation method 400 may encapsulate the message with the Destination Options header, and may continue to block 408. At block 408, the message encapsulation method 400 may encapsulate the message with a tunnel header. For example, the Destination Options header may be as illustrated in FIG. 2. Next, the message encapsulation method 400 may continue to block 410. At block 410, the message encapsulation method 400 may send the message, and may end.

Figure 5:
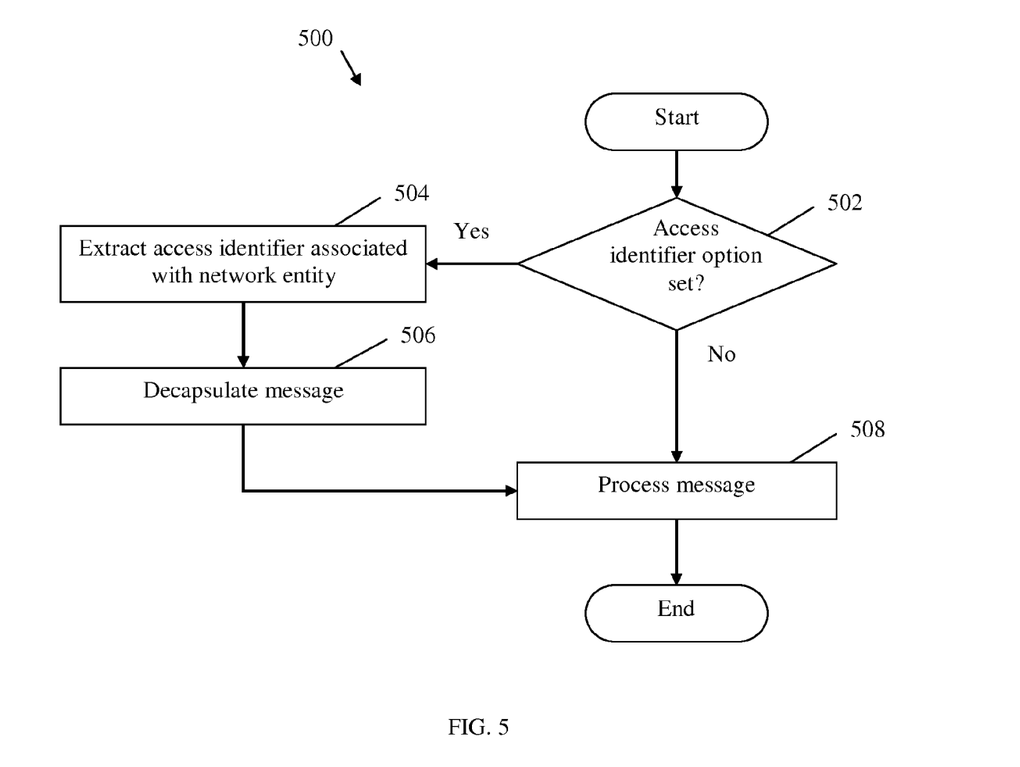
FIG. 5 is a flowchart of an embodiment of a message decapsulation method.

FIG. 5 illustrates one embodiment of a message decapsulation method 500, which may be used to decapsulate a message encapsulated with a tunnel header comprising an access identifier associated with a network entity. For example, the message decapsulation method 500 may be implemented at a residential router, a RG 120, or an AN 130 for downstream messages (e.g. the RA), or may be implemented at an IP edge 140 for upstream messages (e.g. the tunneled RS). The message decapsulation method 500 may begin at block 502, where the message decapsulation method 500 may determine whether the access identifier option is set. The message decapsulation method 500 may continue to block 504 if the condition in block 502 is met, or may proceed to block 508 if the condition in block 502 is not met. At block 504, the message decapsulation method 500 may extract an access identifier associated with a network entity, and may continue to block 506. At block 506, the message decapsulation method 500 may decapsulate the message. Next, the message decapsulation method 500 may continue to block 508, where the message decapsulation method 500 may process the message. For example, the message decapsulation method 500 may use the access identifier to look up the addressing information and policy to be applied to the UE/residential router. The message decapsulation method 500 may then end.

Figure 6:
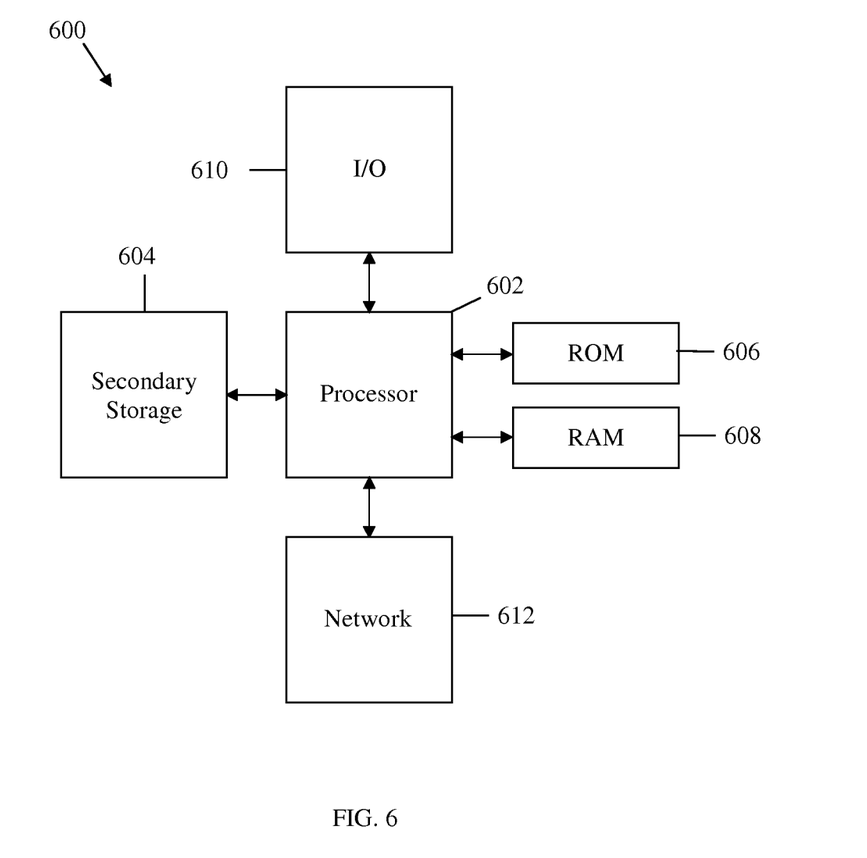
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   encapsulating a router solicitation (RS) message or a neighbor solicitation (NS) message received from a network entity with an Internet Protocol version six (Ipv6) tunnel header comprising an access identifier associated with the network entity,
   wherein the network entity is a residential gateway (RG), and
   wherein the access identifier is a Media Access Control (MAC) address of the RG or a Virtual Local Area Network (VLAN) address associated with the RG.

2. The method of claim 1, wherein the tunnel header comprises an IPv6 Extension Header that comprises the access identifier.

3. The method of claim 2, wherein the IPv6 Extension Header comprises a Destination Options header that comprises the access identifier.

4. The method of claim 3, wherein the Destination Options header comprises an Option Data field that comprises the access identifier.

5. The method of claim 1, wherein the method is implemented by an access node (AN) in a broadband network.

6. The method of claim 5, wherein the network entity is coupled to the AN, and wherein the message comprises an IPv6 prefix that allows the network entity to configure the network entity's IPv6 address.

7. The method of claim 1, wherein the method is implemented by an Internet Protocol (IP) edge in a broadband network.

8. An apparatus comprising:
   an access node (AN) configured to communicate with a residential gateway (RG) via an access network,
   wherein the AN is configured to encapsulate a router solicitation (RS) with an Internet Protocol version six (IPv6) header comprising an access identifier associated with the RG, and send the encapsulated RS to an Internet Protocol (IP) edge,
   wherein the AN is configured to receive a router advertisement (RA),
   wherein the AN is configured to forward the RA to the RG associated with the access identifier, and
   wherein the access identifier is a Media Access Control (MAC) address of the RG or a Virtual Local Area Network (VLAN) address associated with the RG.

9. The apparatus of claim 8, wherein the AN is configured to add the access identifier to the RS.

10. The apparatus of claim 9, wherein the RA is forwarded to the RG to configure the RG with an IPv6 address based on the RA.

11. The apparatus of claim 8, wherein the access network is a Digital Subscriber Line (DSL) network.

12. The apparatus of claim 8, wherein the RS IPv6 header is an IPv6 Tunnel Header that comprises an IPv6 Destination Options header comprising the access identifier.

13. A network component comprising:
   a processor configured to:
      receive a message;
      construct an Internet Protocol version six (IPv6) tunnel header;
      construct a Destination Options header comprising an access identifier associated with a network entity;
      encapsulate the message with the tunnel header and the Destination Options header; and
      send the encapsulated message to a device,
   wherein the message is not altered by the processor,
   wherein the network entity is a residential gateway (RG), and
   wherein the access identifier is a Media Access Control (MAC) address of the RG or a Virtual Local Area Network (VLAN) address associated with the RG.

14. The network component of claim 13, wherein the Destination Options is an IPv6 Destination Options header, wherein the IPv6 Destination Options header comprises an Option Type, an Option Data Length, and an Option Data, and wherein the Option Data comprises the access identifier.

15. The network component of claim 13, wherein the network component is an access node (AN).

16. The network component of claim 13, wherein the network component is an access node (AN), wherein the message is a router solicitation (RS), and wherein sending the encapsulated message to a device comprises sending the encapsulated RS to an IP edge.

17. The network component of claim 13, wherein the network component is an Internet Protocol (IP) edge, wherein the message is a router advertisement (RA), and wherein sending the encapsulated message to a device comprises sending the encapsulated RA to an Access Node (AN).

* * * * *